Patented Jan. 3, 1933

1,892,771

UNITED STATES PATENT OFFICE

ALPHONS O. JAEGER, OF MOUNT LEBANON, AND LLOYD C. DANIELS, OF CRAFTON, PENNSYLVANIA, ASSIGNORS TO THE SELDEN COMPANY, OF PITTSBURGH, PENNSYLVANIA, A CORPORATION OF DELAWARE

PURIFICATION OF CRUDE AROMATIC COMPOUNDS

No Drawing. Application filed October 5, 1929. Serial No. 397,736.

This invention relates to the purification of crude and semirefined aromatic compounds and more particularly aromatic hydrocarbons.

Crude and semirefined aromatic compounds and particularly crude aromatic hydrocarbons such as, or example, crude acenaphthene, crude phenanthrene, crude fluorene, and especially crude anthracene of various grades have usually been purified by solvent processes. While it is possible to obtain products of desirable purity by these methods, for example in the case of crude anthracene when it is treated with a solvent such as furfural which dissolves both carbazole and phenanthrene, the solvent, equipment and labor cost of such processes are considerable items. In the first place, large amounts of solvent are necessary, especially in the case of crude anthracene where the anthracene content is normally less than one-seventh to one-half of the crude material. The processes usually require hot filtrations which are troublesome because of slime formation. When furfural is used to purify crude anthracene, an excellent product is obtained and the only disadvantage in the process lies in its cost items.

According to the present invention crude and semirefined aromatic compounds and especially crude anthracene is purified by a fractional vaporization from the molten state at temperatures below the boiling point of the compound by means of vapors of heterocyclic compounds which do not contain nitrogen in the ring such as, for example, furfural, methyl furfural, tetrahydrofurfuryl alcohol and other furane bodies and the like.

The vapors of these heterocyclic compounds are passed through the heated crude aromatic compound and a fractional sublimation takes place, azeotropic mixtures being formed with constituents of the crude material. In the case of crude anthracene, vapors of furfural will form an azeotropic mixture with anthracene but tend to decrease the vapor pressure of both carbazole and phenanthrene. When tetrahydrofurfuryl alcohol is used an azeotropic mixture is formed with anthracene and carbazole, and the vapor pressures of the phenanthrene and other impurities only are decreased. As a result, when furfural is used in purifying crude anthracene the vapors are rich in anthracene but contain relatively little phenanthrene and carbazole. They may be condensed and the condensate filtered cold, which will result in a still further purification since the cold furfural has high solvent powers for phenanthrene and carbazole but very little solvent power for anthracene. The filtrate, therefore, will contain most of the phenanthrene and carbazole which is carried over in the original vaporization, and the cake is an anthracene of high purity. If desired, the vapors may be cooled only to the point where the solids separate out and then recirculated. This modification will not produre as pure a product since the purifying action of the condensed solvent during filtration is absent, but for some purposes such a process presents economies in labor cost where a less pure product can be satisfactorily used.

It will be evident that fractional sublimation of the present invention permits a much higher recovery of solvent as there is only a single filtration as against two filtrations when the crystallization process is used, and the weight of vapors is much less than when the same compound is used as a solvent. Accordingly, the loss of solvent, which constitutes one of the greatest costs in the purification process, is greatly decreased, so that a saving in chemicals as well as a marked saving in labor and equipment is a characteristic of the present invention.

While it is an advantage that a single non-nitrogenous heterocyclic compound can be used, and in the case of furfural and its homologues very highly purified anthracenes are possible, the invention is in no sense limited to processes using a single heterocyclic compound; mixtures of two or more may be used, or the heterocyclic compound may be mixed with other solvents such as, for example, chlorinated compounds, hydrocarbons of the benzene series, nitrocompounds, and the like. The use of these other solvent vapors is not claimed as such in the present invention, forming the subject matter of our co-pending applications, Serial No. 397,733 filed October 5, 1929 and Serial No. 404,202 filed Nov. 1, 1929. It is also possible to add other solvents to the condensate before filtering, but in the case of furfural, when purifying crude anthracene, this is unnecessary as furfural is the best solvent known for anthracene purification. However, in some cases it may be desirable to dilute the furfural with cheaper compounds. Such modifications are included in the present invention.

The fractional vaporization may be effected in a simple batch process as described above, or the molten crude aromatic compound may be either sprayed into ascending vapors of the subliming solvent or permitted to flow countercurrent thereto, for example in a baffle tower. These processes require a more complicated equipment, but present the advantage that the process may be made continuous with respect to the crude product, the still residue being continuously drawn off as fresh material is sprayed or flows down the tower. The advantages of continuous processes are thereby made available, and, as has been described above, the second step in the process, namely, the condensation of the purified product, may also be made continuous with regard to the carrier vapor by condensing out at a temperature above the boiling point of the vapor. It should be understood that the process may be made continuous as to either or both steps.

The invention will be described in greater detail in connection with the following specific examples, which are merely illustrative embodiments, and it should be understood that the invention is not limited to the details therein set forth.

Example 1

Crude anthracene of about 29% purity is placed in a still and heated to about 280° C. and vapors of furfural, if desired, superheated to the temperature of the molten anthracene, are passed through. The vapor stream which is rich in anthracene but contains only small amounts of phenanthrene and carbazole is then led to a condenser and condensed and the condensate filtered cold, that is to say at atmospheric temperatures. The cake contains 88.5% anthracene, about 4% carbazole and the remainder phenanthrene, the recovery being 76% of the original crude. The filtrate is then distilled, and the residue consists of an anthracene of about 14% purity, amounting to a recovery of about 23.8% of the anthracene, the total recovery of anthracene in the purified cake and still residue, therefore, amounting to 99.8%. The small amount of residue from the filtrate can be added to the next batch of crude anthracene, for although its anthracene content is lower, the amount is not sufficiently great to cause trouble.

Example 2

A crude anthracene as described in Example 1 is treated with methyl furfural vapors or with vapors of a crude grade of furfural which contains large amounts of methyl furfural. The purified anthracene obtained is of about the same quality as in Example 1 and the recovery is as good.

Example 3

Crude anthracene containing about 14% anthracene is melted and heated to 280–320° C. and vapors of tetrahydrofurfuryl alcohol are passed through. The resulting vapor stream, which consists of anthracene and phenanthrene together with a little carbazole, is condensed and filtered as described in Example 1, and the filtrate distilled. The purified anthracene cake contains about 58% anthracene, 32–33% carbazole, and the remainer mostly phenanthrene. The recovery of anthracene is about 50%. The still residue contains approximately 12–13.5% anthracene and the recovery is about 46%, making a total anthracene recovery of about 96%. The still residue, having approximately the same anthracene content as the crude, is added to the next batch of crude to be treated. It will be noticed that tetrahydrofurfuryl alcohol has high solvent action for phenanthrene, but does not have a high solvent action for carbazole and, therefore, the anthracene obtained is fairly high in carbazole, but when used for the catalytic oxidation to anthraquinone carbazole is burned out in the reaction so that this is not a serious drawback.

Example 4

An anthracene such as that described in Example 3 is treated with furfural vapors instead of tertahydrofurfuryl alcohol, and the temperature is kept at 280° C. The purified anthracene cake is about 80% purity with a recovery of around 65%, the still residue contains anthracene of about 11–12% purity, with a recovery of around 30%, or an overall recovery of about 95%.

Example 5

A crude anthracene of about 29% purity is treated with tetrahydrofurfuryl vapors under the conditions described in Example 3. The purified cake contains anthracene of 68–70% purity with a recovery of 68%. The still residue contains anthracene of about 21% purity, with a recovery of about 27%, or an overall recovery of about 95%.

In the specification and claims the terms "subliming" and "sublimation" are used in their broad technical sense to define the passage of material into the vapor phase at temperatures below its boiling point at the pressures used, and it is understood that these terms will have no other meaning.

What is claimed as new is:

1. A method of purifying solid crude aromatic compounds, which comprises fractionally vaporizing the product in a carrier gas stream containing vapors of a compound containing a furane or hydrogenated furane nucleus by bringing the carrier gas stream containing the furane compound into contact with the crude aromatic compound.

2. A method of purifying a solid crude aromatic hydrocarbon, which comprises fractionally vaporizing the product in a carrier gas stream containing vapors of a compound containing a furane or hydrogenated furane nucleus by bringing the carrier gas stream containing the furane compound into contact with the crude aromatic compound.

3. A method of purifying crude anthracene, which comprises fractionally vaporizing the product in a carrier gas stream containing vapors of a compound containing a furane or hydrogenated furane nucleus by bringing the carrier gas stream containing the furane compound into contact with the crude anthracene.

4. A method of purifying solid crude aromatic compounds, which comprises fractionally vaporizing the product in a carrier gas stream containing vapors of furfural by bringing the carrier gas stream containing the furfural vapor into contact with the crude aromatic compound.

5. A method of purfying a solid crude aromatic hydrocarbon, which comprises fractionally vaporizing the product in a carrier gas stream containing vapors of furfural by bringing the carrier gas stream containing the furfural vapor into contact with the crude aromatic compound.

6. A method of purifying crude anthracene, which comprises fractionally vaporizing the product in a carrier gas stream containing vapors of furfural by bringing the carrier gas stream containing the furfural vapor into contact with the crude anthracene.

7. A method according to claim 1, in which the vapors from the vaporization are condensed at a temperature at which substantially all of the carrier vapors of the furane compound are condensed and the condensate filtered cold whereby a further solvent purification is effected in addition to the purification resulting from the step of fractional vaporization.

8. A method according to claim 2, in which the vapors from the vaporization are condensed at a temperature at which substantially all of the carrier vapors of the furane compound are condensed and the condensate filtered cold whereby a further solvent purification is effected in addition to the purification resulting from the step of fractional vaporization.

9. A method according to claim 3, in which the vapors from the vaporization are condensed at a temperature at which substantially all of the carrier vapors of the furane compound are condensed and the condensate filtered cold whereby a further solvent purification is effected in addition to the purification resulting from the step of fractional vaporization.

10. A method according to claim 4, in which the vapors from the vaporization are condensed at a temperature at which substantially all of the carrier vapors of the furane compound are condensed and the condensate filtered cold whereby a further solvent purification is effected in addition to the purification resulting from the step of fractional vaporization.

11. A method according to claim 5, in which the vapors from the vaporization are condensed at a temperature at which substantially all of the carrier vapors of the furane compound are condensed and the condensate filtered cold whereby a further solvent purification is effected in addition to the purification resulting from the step of fractional vaporization.

12. A method according to claim 6, in which the vapors from the vaporization are condensed at a temperature at which substantially all of the carrier vapors of the furane compound are condensed and the condensate filtered cold whereby a further solvent purification is effected in addition to the purification resulting from the step of fractional vaporization.

Signed at Pittsburgh, Pennsylvania, this 4th day of October, 1929.

ALPHONS O. JAEGER.
LLOYD C. DANIELS.